United States Patent
Ruiz-Najera

(10) Patent No.: US 9,232,869 B1
(45) Date of Patent: Jan. 12, 2016

(54) UTENSIL AND METHOD FOR HOLDING A FLATBREAD

(71) Applicant: Tino Ruiz-Najera, Reno, NV (US)

(72) Inventor: Tino Ruiz-Najera, Reno, NV (US)

( * ) Notice: Subject to any disclaimer, the term of this patent is extended or adjusted under 35 U.S.C. 154(b) by 0 days.

(21) Appl. No.: 14/460,018

(22) Filed: Aug. 14, 2014

(51) Int. Cl.
*A47J 43/28* (2006.01)
*A47G 21/00* (2006.01)

(52) U.S. Cl.
CPC *A47G 21/00* (2013.01); *A47J 43/28* (2013.01)

(58) Field of Classification Search
CPC ... A47G 21/02; A47G 21/023; A47G 21/026; A47J 43/28; A47J 43/283
USPC ......... 294/5, 5.5, 173, 8.5, 11, 14, 23.5, 55.5, 294/61, 182; 30/322, 323; 99/421 A
See application file for complete search history.

(56) References Cited

U.S. PATENT DOCUMENTS

| | | | | |
|---|---|---|---|---|
| 1,226,539 A | * | 5/1917 | Larson et al. | 294/23.5 |
| 1,769,471 A | * | 7/1930 | Smith | 30/322 |
| 1,809,254 A | * | 6/1931 | Smith | 30/322 |
| 2,577,360 A | * | 12/1951 | Poganski | 294/5.5 |
| 2,720,699 A | * | 10/1955 | Boruvka | 30/322 |
| 2,957,404 A | | 10/1960 | Richardson | |
| 3,078,787 A | * | 2/1963 | Arseneault | 99/419 |
| 4,154,155 A | | 5/1979 | Brignall | |
| 6,270,132 B1 | * | 8/2001 | Kretschmer | 294/5 |
| D524,124 S | * | 7/2006 | Tashjian | D7/683 |
| 8,061,746 B1 | * | 11/2011 | Stephens, III | 294/61 |
| 2004/0061345 A1 | * | 4/2004 | Harmon et al. | 294/61 |

FOREIGN PATENT DOCUMENTS

FR  2 975 580  * 11/2012

* cited by examiner

*Primary Examiner* — Dean Kramer
(74) *Attorney, Agent, or Firm* — Vincent G. LoTempio; Kloss, Stenger & LoTempio; David Stephenson

(57) ABSTRACT

A utensil and method for holding a flatbread during preparation. The utensil secures the flatbread between a pair of rods to enable removal from hot oil, rolling, and general preparation of the flatbread, such as a tortilla. The rods that are disposed in a somewhat parallel spaced-apart relationship to one another. A space forms between the rods to securely position the flatbread between the rods for support. Each rod includes a proximal end that joins with a handle for facilitated handling of the utensil, and a distal end that engages the flatbread in a variety of manipulations. The proximal ends join together to form a junction. The junction includes an impeding portion that tapers into a linear portion. The impeding portion is configured to bias the rods slightly towards each other while still maintaining space between the rods. The linear portion fits into a handle.

16 Claims, 8 Drawing Sheets

UTENSIL AND METHOD FOR HOLDING A FLATBREAD

FIELD OF THE INVENTION

The present invention relates generally to a utensil and method for holding a flatbread. More so, a utensil and method for holding a flatbread that provides a tool that secures the flatbread between a pair of rods to enable removal from hot oil, rolling, and general preparation of the flatbread.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, another aspect of the prior art generally useful to be aware of is that A flatbread is a simple bread made with flour or corn, water, and salt, and then thoroughly rolled into flattened dough. A tortilla is a type of flatbread. Typically, the tortilla is a type of thin flatbread made from finely ground wheat flour. Tortillas are commonly prepared with meat to make dishes such as tacos, burritos, and enchiladas.

It is well known that the preparation of tortillas involves numerous manipulations of dough, cooking pans, and finished tortillas. In one common preparation, a dough composition made from flour or corn, water, and salt is mixed and formed into a generally large ball shape. Next, the dough is divided into smaller 1½" balls. Each ball is flattened and rolled into an approximate 7" circle with a rolling pin. The circle of dough may then be cooked in a greased griddle for approximately one minute on each side.

Typically, it is at the stage of coking, filling, and serving that difficulties may arise with preparation of the tortilla. The griddle is hot and has hot oil therein. An inadequate utensil makes grasping the tortilla difficult without breaking it. Also, the tortilla must be filled and rolled while still hot to achieve optimal taste. This can be difficult without the proper utensil.

Even though the above cited methods for holding a flatbread some of the needs of the market, a utensil and method for holding a flatbread that enables the flatbread to be clamped, penetrated, flipped, dipped, and rolled during preparation is still desired.

SUMMARY OF THE INVENTION

The present invention is directed to a utensil and method for holding a flatbread. The utensil and method provides a simple tool that secures the flatbread between a pair of spatially separated, parallel rods to enable removal from hot oil, rolling, and general preparation of the flatbread. The utensil is especially effective during cooking, preparation, and serving of the flatbread. In some embodiments, the utensil may include a small, hand-held, tool, typically used in the kitchen, which is useful for preparation of a flatbread, such as a tortilla. The utensil has a pair of rods that are spatially arranged such that the flatbread can easily and efficiently be clamped, penetrated, flipped, dipped, and rolled. In one embodiment, the utensil is effective in retaining the tortilla in a desired orientation while additional food compositions are integrated into the flatbread, i.e., placing a filling onto the flatbread and then rolling into a cylindrical shape. The utensil is also effective for removing the flatbread from hot oil during cooking, integrating fillings into the flatbread, rolling the flatbread, dipping the flatbread in a sauce, and serving the flatbread from a flat or rolled up configuration.

In some embodiments, the utensil may include a pair of rods disposed in a somewhat parallel spaced-apart relationship to one another. The rods work in conjunction to hold and manipulate the flatbread. A space forms between the rods along a longitudinal axis. The space is sufficiently sized so as to securely position the flatbread between the rods for support, while simultaneously performing various manipulations to the flatbread. Each rod includes a proximal end that joins with a handle for facilitated handling and use of the utensil, and a distal end that engages the flatbread in a variety of manipulations.

The proximal ends of the rods join together to form a junction. In one embodiment, the junction forms an impeding portion, such as a diamond shape, that tapers into a linear portion. The impeding portion is configured to bias the rods slightly towards each other while still maintaining the space between each rod. This biased tendency creates a tension that is effective in retaining the flatbread more securely along a longitudinal axis of the rods. Consequently, the flatbread is more effectively held in a desired orientation by the pair of rods slightly pressing inwardly. The enhanced retention of the flatbread within the space enables more complicated manipulations of the flatbread, such as rotating the utensil to roll the flatbread in a sauce or powder, flipping the flatbread, and shaping the flatbread in a desired shape while cooking in hot oil. This is because the flatbread has a less likely tendency to slip off the rods when there is an inwardly angled disposition.

In some embodiments, the proximal end joins with a handle. The handle includes a rod end that receives the first and second rods at the linear portion of the junction. The handle facilitates handling and use of the utensil. In one embodiment, the handle comprises a substantially cylindrical shape that is configured to be operable to be gripped by a hand. The rod end of the handle may include a cavity that receives the linear portion of the junction.

At the handle, the impeding portion of the junction provides a second function of restricting movement of the rods further into the cavity by maintaining the proximal end at a predetermined distance relative to the handle. A washer may also be used as a barrier between the impeding portion and the cavity to help form a tight fit between the rods and the handle. In another embodiment, the impeding portion of the junction may also be effective for restricting contact between the flatbread and the handle, in essence serving as a barrier. In yet another function for the impeding portion, the generally diamonds shape may be used for hanging the utensil on kitchen walls, cupboards, and the like.

In some embodiments, each distal end of the rods terminates with a tapered portion, such as a barb. The tapered portions can at least partially penetrate the flatbread to enable picking up and manipulation of the flatbread. This can be especially useful while the flatbread is cooking in hot oil. The flatbread may slide into the space through the distal end before sidably traversing along the longitudinal axis of the rods towards the proximal end. Once the flatbread is secured between the rods, the flatbread may be rolled, laid flat, filled, or dipped into the appropriate medium.

One objective of the present invention is to provide a kitchen utensil that can manipulate a tortilla for cooking, filling, dipping, serving, and even eating.

Another objective is to protect a user from handling the flatbread with bare hands or with a cumbersome kitchen utensil while the flatbread is cooking in oil.

Another objective is to facilitate manipulation of the flatbread while rolling in a sauce, filling, or cream.

Another objective is to reduce the potential mess that can occur when coating the flatbread with a sauce or while filling the flatbread.

Yet another objective is to provide an inexpensive kitchen utensil for manipulating tortillas.

Yet another objective is to provide a kitchen utensil that is intuitive to use, such that a child could prepare tortillas with the utensil.

Yet another objective is to provide a tortilla holder which is comparatively simple in structural detail.

Yet another objective is to provide a tortilla holder which may be easily and conveniently manufactured at a very nominal cost.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
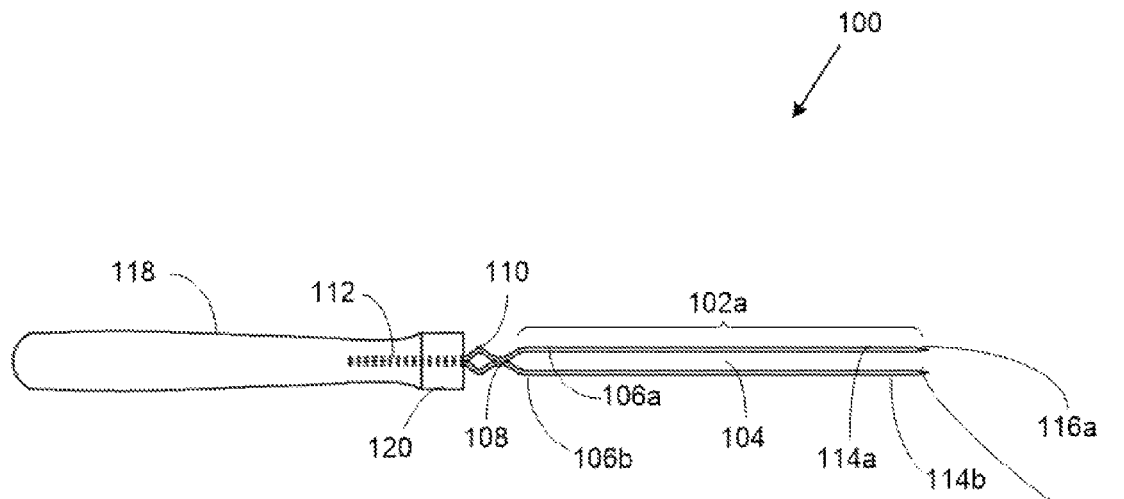
FIG. 1 illustrates an elevated side view of an exemplary utensil showing an exemplary pair of rods having an exemplary impeding portion and linear portion, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention presented in FIGS. 1-8B, a utensil 100 and method 200 are used to hold a flatbread 124 during cooking, preparation, and serving. The utensil 100 secures the flatbread 124 between a pair of rods 102a, 102b to enable removal of the flatbread 124 from hot oil, rolling the flatbread 124, and general preparation of the flatbread 124 without exposing the hands to burning or messy contact with the flatbread 124. The utensil 100 is especially effective for removing the flatbread 124 from hot oil, and immediately filling the flatbread 124 with a food composition while the flatbread 124 is hot. In some embodiments, the flatbread 124 may include, without limitation, a tortilla, a tortilla de rescoldo, an arepa, a pita, a roti, a pancake, a chapatti, a laobing, a nan, unleavened bread, and any bread made with flour or corn, water, and salt, and then thoroughly rolled into flattened dough.

In some embodiments, the utensil 100 may include a small, hand-held, tool, typically used in the kitchen, which is useful for preparation of a flatbread 124, such as a tortilla. The utensil 100 has a pair of rods 102a, 102b that are spatially arranged such that the flatbread 124 can easily and efficiently be clamped, penetrated, flipped, dipped, and rolled. In one embodiment, the utensil 100 is effective in retaining the tortilla in a desired orientation while additional food compositions are integrated into the flatbread 124, i.e., placing a filling onto the flatbread 124 and then rolling into a cylindrical shape. The utensil 100 is also effective for removing the flatbread 124 from hot oil during cooking, integrating fillings into the flatbread 124, rolling the flatbread 124, dipping the flatbread 124 in a sauce, and serving the flatbread 124 from a flat or rolled up configuration.

Those skilled in the art, in light of the present teachings, will recognize that tortillas are often filled with beans, meats, cheeses, and sauces to form burritos, enchiladas, and tacos. This process requires the tortilla to be cooked in oil, removed from the oil, filled, and then rolled around the filling. Additionally, the tortilla may have a flaccid composition prior to cooking in hot oil. The cooking process may form the tortilla into a rigid form. The utensil 100 may be used to hold the tortilla in a desired shape, such as a bowl-shape, a concave shape, or the like. These manipulations can expose the skin to hot oil and messy foods.

As referenced in FIG. 1, the utensil 100 may include a pair of rods 102a, 102b disposed in a somewhat parallel spaced apart relationship to one another. The pair of rods 102a, 102b may have a length of about 6"-24", and a generally planar shape. However in other embodiments, the configuration of the rods 102a, 102b can include cylindrical shapes, ridged surfaces, barbed surfaces, and outer protective sleeves. The rods 102a, 102b may be fabricated from a stainless steel composition that is resistant to hot oils during cooking, and also effective for inhibiting bacterial growth. However in some embodiments, the rods 102a, 102b may have other material compositions, including, without limitation, copper, iron, a metal alloy, wood, fiberglass, and a rigid polymer.

Figure 2:
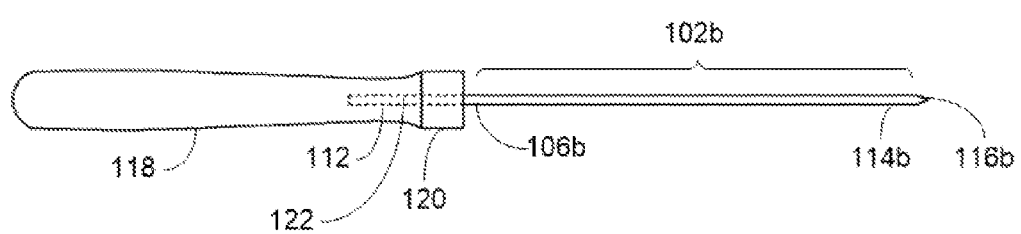
FIG. 2 illustrates an elevated side view of an exemplary utensil showing the pair of rods, in accordance with an embodiment of the present invention.

FIG. 2 illustrates one of the rods 102a, 102b from an elevated side view. The rods 102a, 102b work in conjunction to hold and manipulate the flatbread 124 by providing a support to the edges and various regions of the flatbread 124. The flatbread 124 can be held from either rod 102a, or both rods 102a, 102b simultaneously. A space 104 forms between the rods 102a, 102b along a longitudinal axis therebetween. The space 104 is sufficiently sized so as to securely position the flatbread 124 between the rods 102a, 102b for support, while simultaneously performing various manipulations to the flatbread 124. In some embodiments, the space 104 may be about ½" to 2" wide.

Figure 3:
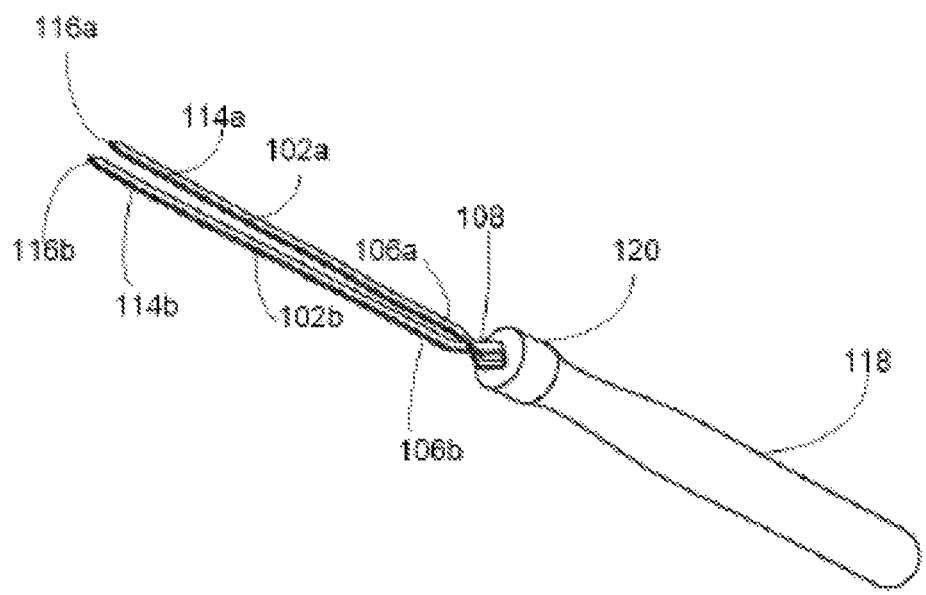
FIG. 3 illustrates a detailed perspective view of an exemplary utensil, in accordance with an embodiment of the present invention.

Turning now to FIG. 3, each rod 102a, 102b includes a distal end 114a, 114b. The distal ends 114a, 114b are configured to manipulate the flatbread 124. Each distal end 114a, 114b comprises a tapered portion 116a, 116b, such as a barb. However, any sharp, terminal point on the distal end 114a, 114b that has the capacity to penetrate the flatbread 124 may be used. The tapered portion 116a, 116b can at least partially penetrate the flatbread 124 to facilitate picking up and moving the flatbread 124 to and from a desired area. Additionally, the tapered portion 116a, 116b is design for universal use in terms of a left or right handed person because of how the tapered portion 116a, 116b is shaped. The tapered portion 116a, 116b is cut from both sides to provide facilitated use for both a left and right handed user.

Each rod 102a, 102b further includes a proximal end 106a, 106b that allows for facilitated handling and use of the utensil 100, and a distal end 114a, 114b that engages the flatbread 124. FIG. 3 illustrates the proximal ends 106a, 106b of the rods 102a, 102b joined together to form a junction 108. In one embodiment, the junction 108 forms an impeding portion 110, such as a diamond shape, that tapers into a linear portion 112. The impeding portion 110 is configured to bias the rods 102a, 102b slightly towards each other while still maintaining the space 104 between each rod 102a, 102b. This biased tendency creates a tension that is effective in retaining the flatbread 124 more securely along a longitudinal axis of the rods 102a, 102b. Consequently, the flatbread 124 is more effectively held in a desired orientation by the pair of rods 102a, 102b slightly pressing inwardly. The enhanced retention of the flatbread 124 within the space 104 enables more complicated manipulations of the flatbread 124, such as rotating the utensil 100 to roll the flatbread 124 in a sauce or powder, flipping the flatbread 124, and shaping the flatbread 124 in a desired shape while cooking in hot oil. This is because the flatbread 124 has a less likely tendency to slip off the rods 102a, 102b when there is an inwardly angled disposition.

Figure 4:
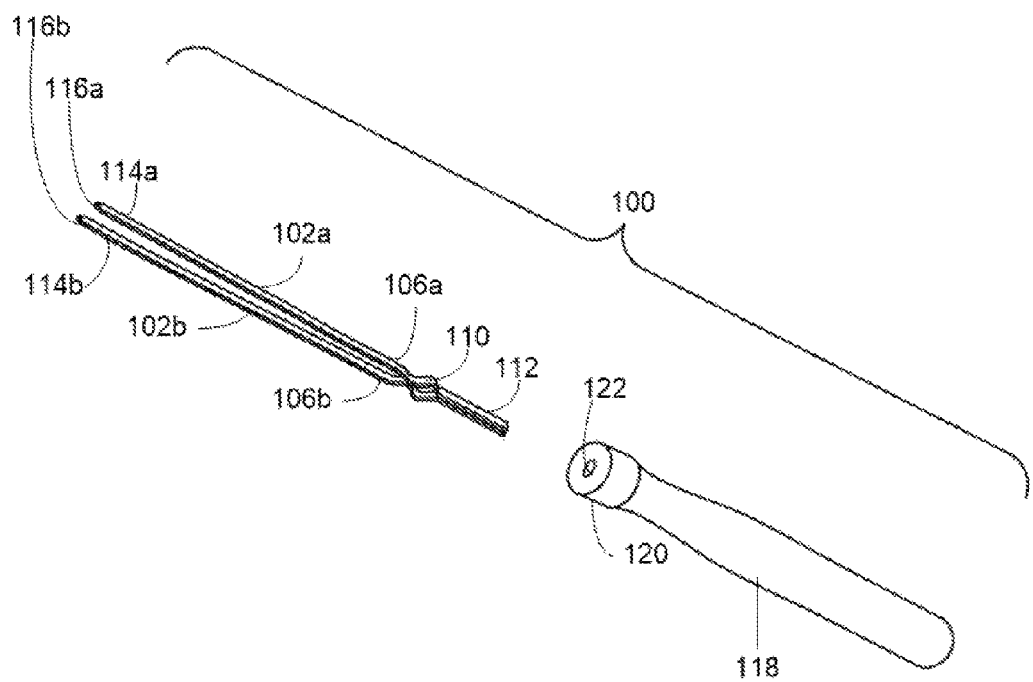
FIG. 4 illustrates a detailed perspective view of the pair of rods separated from an exemplary handle, in accordance with an embodiment of the present invention.

Turning now to FIG. 4, the proximal end 106a, 106b joins with a handle 118. In one embodiment, the handle 118 comprises a substantially cylindrical shape that is configured to be operable to be gripped by a hand. The handle 118 facilitates handling and use of the utensil 100. The handle 118 includes a rod end 120 that receives the linear portion 112 of the junction 108. The rod end 120 may include a cavity 122 that forms a snug fit with the linear portion 112. In one embodiment, a washer positions between the rod end 120 and the impeding portion 110 of the junction 108 to prevent undesirable movement by the pair of rods 102a, 102b while attached to the handle 118.

It is significant to note that the impeding portion 110 provides a secondary function of restricting movement of the rods 102a, 102b further into the cavity 122 by maintaining the proximal ends 106a, 106b at a predetermined distance relative to the handle 118. The washer may also be used as a barrier between the impeding portion 110 and the cavity 122 to help form a tight fit between the rods 102a, 102b and the handle 118. In another embodiment, the diamond shape of the impeding portion 110 serves a third function of restricting contact between the flatbread 124 and the handle 118, in essence serving as a barrier. In yet another function for the impeding portion 110, the generally diamonds shape may be used for hanging the utensil 100 on kitchen walls, cupboards, and the like. This facilitates access to the utensil 100.

Figure 5:
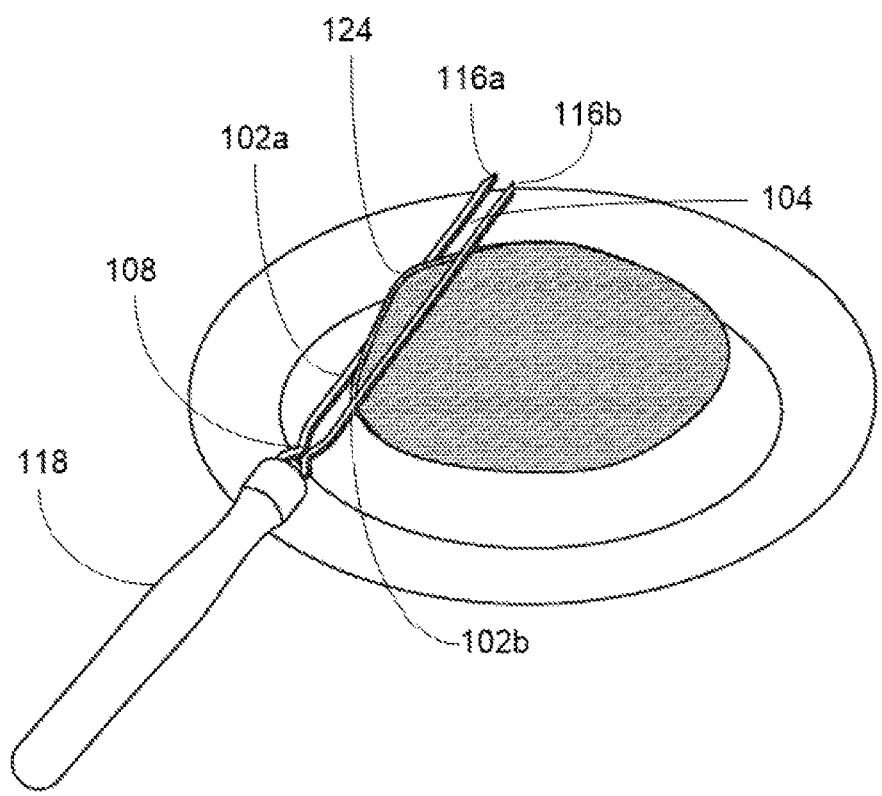
FIG. 5 illustrates a detailed perspective view of the utensil positioned to engage an exemplary flatbread cooking in hot oil, in accordance with an embodiment of the present invention.
Figure 6:
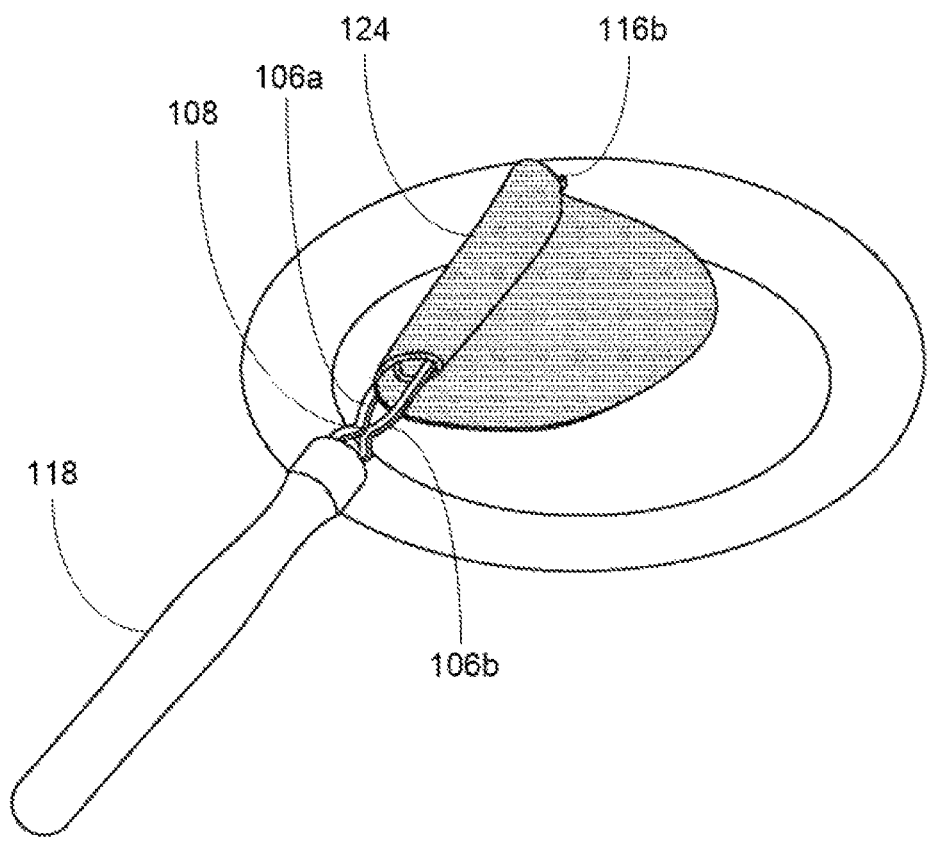
FIG. 6 illustrates a detailed perspective view of the flatbread positioned in the space between the pair of rods, in accordance with an embodiment of the present invention.
Figure 7:
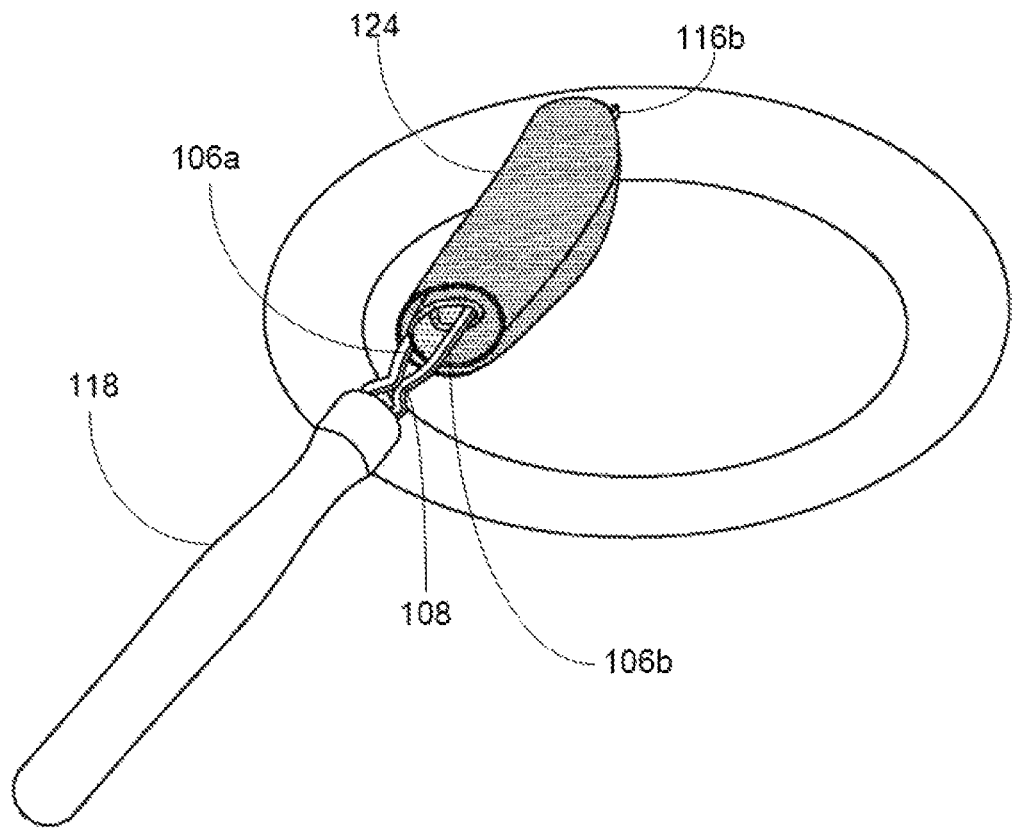
FIG. 7 illustrates a detailed perspective view of the utensil rolling up the flatbread, in accordance with an embodiment of the present invention.

FIGS. 5, 6, and 7 illustrate the utensil 100 manipulating the flatbread 124 from a pan of hot oil into a rolled configuration. This can especially be effective after the flatbread 124, such as a tortilla has been filled with a substance. In some embodiments, the flatbread 124 can overlay the pair of rods 102a, 102b, or the flatbread 124 can partially pass through the space 104 between the pair of rods 102a, 102b, or the flatbread 124 can simply be penetrated by the tapered portions 116a, 116b at the distal ends 114a, 114b. In many instances, the rigidity of the flatbread 124 determines the orientation and position of the flatbread 124 in relation to the rods 102a, 102b. For example, a precooked tortilla is retained between the rods 102a, 102b while still flaccid. The rods 102a, 102b can press the tortilla in the space 104 between the rods 102a, 102b and maintain the tortilla in a folded, or U-shaped form while cooking the tortilla in oil. The fully cooked, rigid, U-shaped tortilla may then be removed from the oil and manipulated for filling or simply removed from the rods 102a, 102b, as desired. In another example, the tortilla can fry in a flat orientation for a predetermined duration. The utensil 100 may then transport the tortilla out of the hot oil by stabbing, lifting, or rolling out of the pan without exposing body parts to the oil. There are myriad combinations for manipulating the flatbread 124 with the utensil 100 and method 200.

As shown in FIG. 5, the distal end 114a, 114b of each rod terminates with a pair of tapered portions 116a, 116b. The tapered portions 116a, 116b can at least partially penetrate the flatbread 124 to enable picking up and manipulation of the flatbread 124 in the pan. The use of a pair of tapered portions 116a, 116b is especially beneficial while cooking the flatbread 124 in hot oil. As FIG. 6 illustrates, once the flatbread 124 is moved through the space 104 between the distal ends 114a, 114b, the flatbread 124 can slide along a longitudinal axis of the rods 102a, 102b towards the proximal end 106a, 106b. FIG. 7 shows the flatbread 124 secured between the rods 102a, 102b, while being rolled. However, from this position, the flatbread 124 may also be laid flat, filled, or dipped into the appropriate food composition.

Figure 8A:
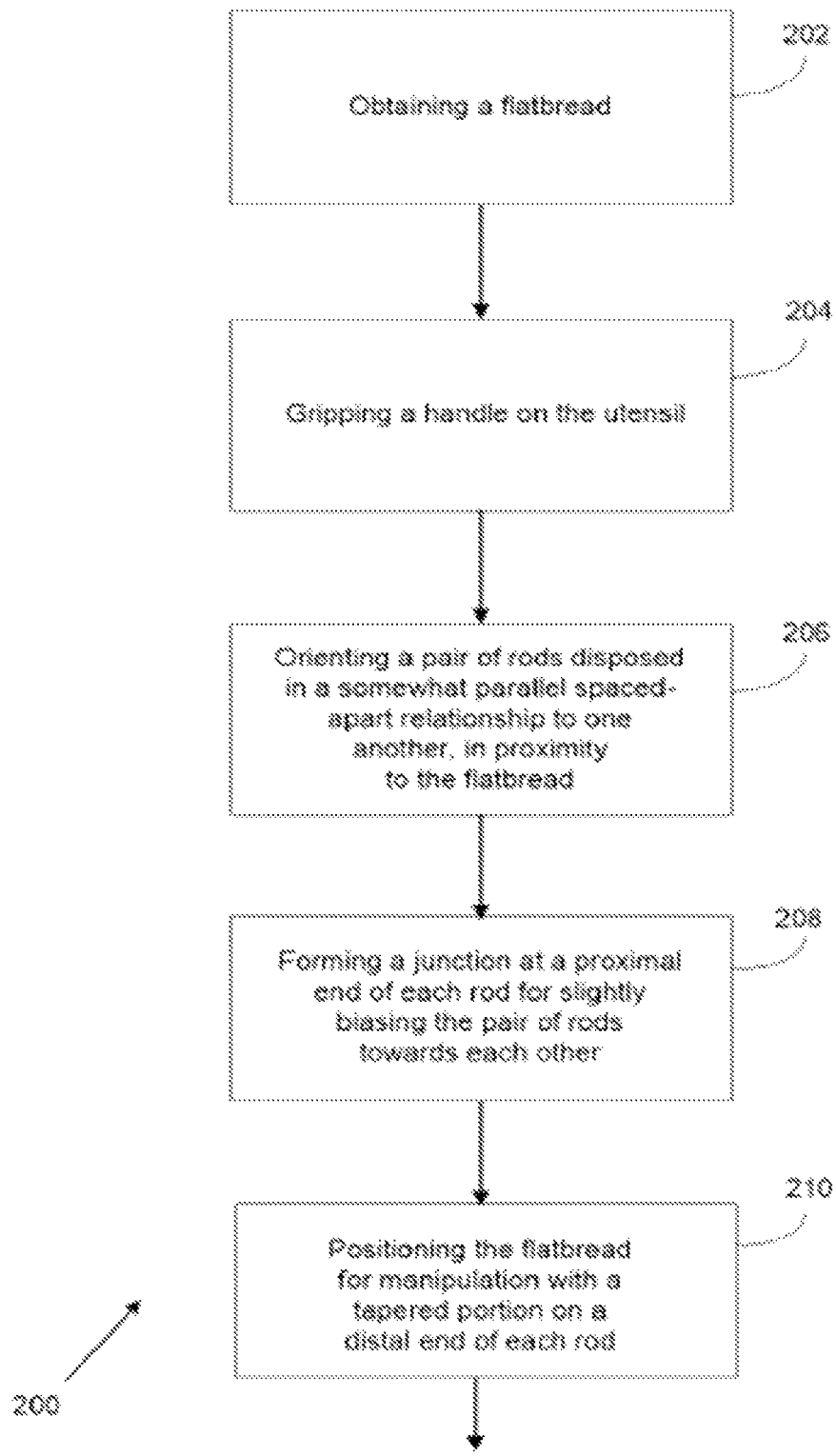
FIGS. 8A and 8B illustrate a flowchart diagram of an exemplary method for holding a flatbread with a utensil, in accordance with an embodiment of the present invention.
Figure 8B:
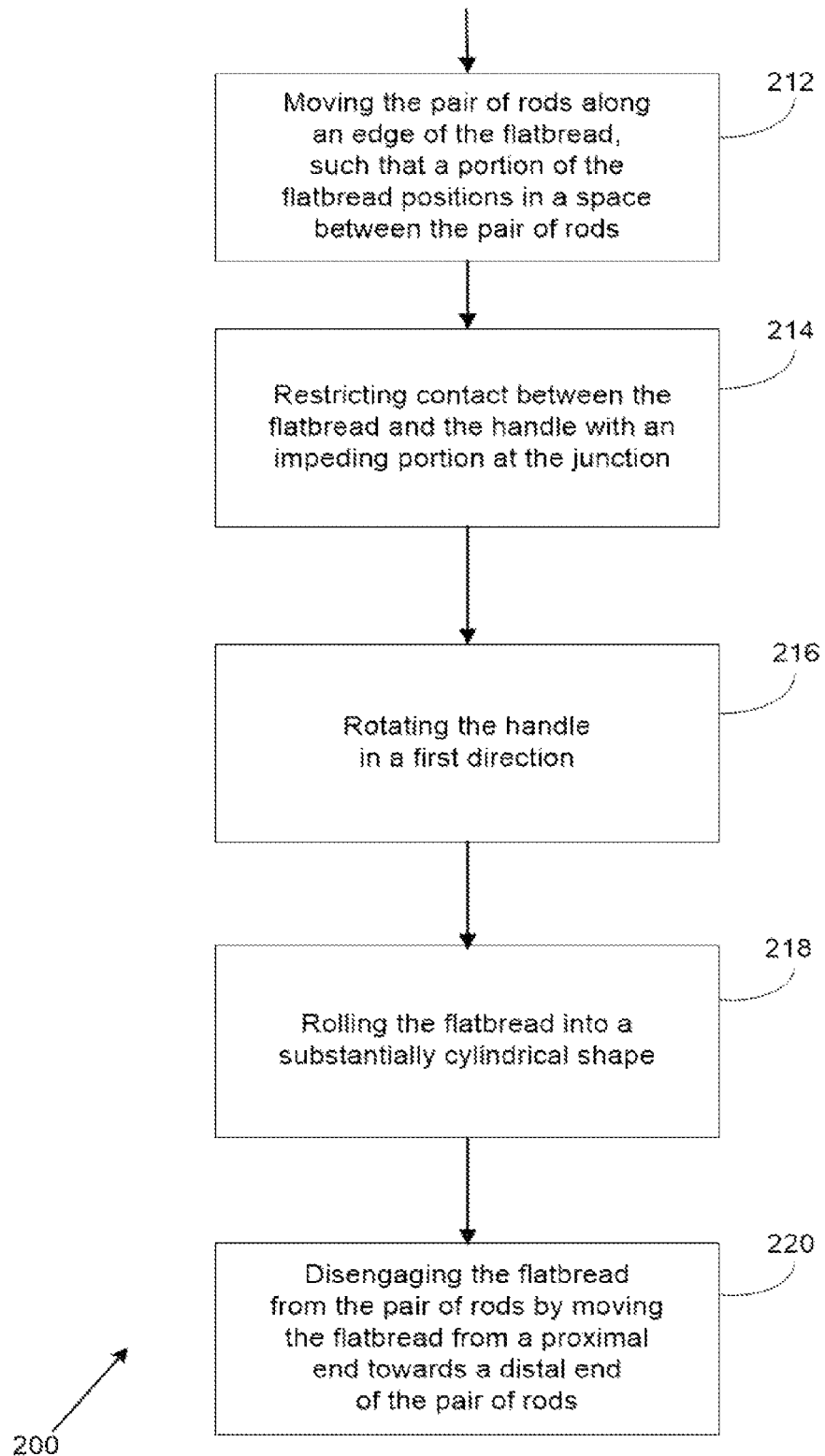

FIGS. 8A and 8B illustrate a flowchart diagram of an exemplary method 200 for holding a flatbread 124 with a utensil 100. The method 200 is used to hold the flatbread 124 with a utensil 100 having a handle 118 and a pair of spatially separated, parallel rods 102a, 102b that are slightly biased inwardly for enhanced control of the flatbread 124. The flatbread 124 that is held in a space 104 between the rods 102a, 102b may include a tortilla that is manipulated for cooking, preparation, and serving. In some embodiments, the method 200 may include an initial Step 202 of obtaining a flatbread 124. In some embodiments, the flatbread 124 may include, without limitation, a tortilla, a tortilla de rescoldo, an arepa, a pita, a roti, a pancake, a chapatti, a laobing, a nan, unleavened bread, and any bread made with flour or corn, water, and salt, and then thoroughly rolled into flattened dough. The method 200 may further comprise a Step 204 of gripping a handle 118 on the utensil 100. The utensil 100 may include a small, hand-held, tool, typically used in the kitchen, which is useful for preparation of the flatbread 124.

A Step 206 includes orienting a pair of rods 102a, 102b disposed in a somewhat parallel spaced apart relationship to one another, in proximity to the flatbread 124. The rods 102a, 102b work in conjunction 108 to hold and manipulate the flatbread 124 by providing a support to the edges and various regions of the flatbread 124. The flatbread 124 can be held from either rod 102a, or both rods 102a, 102b simultaneously. In some embodiments, a Step 208 comprises forming a junction 108 at a proximal end 106a, 106b of each rod 102a, 102b for slightly biasing the pair of rods 102a, 102b towards each other. Each rod 102a, 102b includes a proximal end 106a, 106b that allows for facilitated handling and use of the utensil 100, and a distal end 114a, 114b that engages the flatbread 124. In one embodiment, the junction 108 forms an impeding portion 110, such as a diamond shape, that tapers into a linear portion 112. The impeding portion 110 is configured to bias the rods 102a, 102b slightly towards each other while still maintaining the space 104 between each rod 102a, 102b. This biased tendency creates a tension that is effective in retaining the flatbread 124 more securely along a longitudinal axis of the rods 102a, 102b. Consequently, the flatbread 124 is more effectively held in a desired orientation by the pair of rods 102a, 102b slightly pressing inwardly.

A Step 210 includes positioning the flatbread 124 for manipulation with the tapered portions 116a, 116b on a distal end 114a, 114b of each rod 102a, 102b. Each rod 102a, 102b includes a distal end 114a, 114b. The distal end 114a, 114bs are configured to manipulate the flatbread 124. The tapered portions 116a, 116b can at least partially penetrate the flatbread 124 to facilitate picking up and moving the flatbread 124 to a desired area. In some embodiments, a Step 212 may include moving the pair of rods 102a, 102b along an edge of the flatbread 124, such that a portion of the flatbread 124 positions in a space 104 between the pair of rods 102a, 102b. A Step 214 comprises restricting contact between the flatbread 124 and the handle 118 with an impeding portion 110 at the junction 108. In one embodiment, the generally diamond shape of the impeding portion 110 is effective as a barrier.

A Step 216 includes rotating the handle 118 in a first direction. The flatbread 124 is secured between the rods 102a, 102b, such that rotation of the handle 118 creates a rolled configuration. In some embodiments, a Step 218 may include rolling the flatbread 124 into a substantially cylindrical shape. However in one embodiment, the flatbread 124 may be filled with a food composition prior to rolling, such that a burrito or enchillada is formed. A Step 220 comprises disengaging the flatbread 124 from the pair of rods 102a, 102b by moving the flatbread 124 from a proximal end 106a, 106b towards a distal end 114a, 114b of the pair of rods 102a, 102b. Once the flatbread 124 is disengaged from the utensil 100, additional flatbreads 124 may be manipulated by the utensil 100 for preparation and serving.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A utensil for holding a flatbread, the utensil comprises:
a pair of rods disposed in a somewhat parallel spaced-apart relationship to one another, each rod comprising a proximal end, the proximal end comprising a junction having a substantially diamond shaped impeding portion and a linear portion, the junction configured to bias the pair of rods inwardly towards each other, each rod further comprising a distal end, the distal end comprising a tapered portion; and
a handle configured to facilitate manipulation of the utensil, the handle comprising a rod end having a cavity, the cavity configured to receive the linear portion for joining the pair of rods to the handle.

2. The utensil of claim 1, wherein the pair of rods are configured to hold a flatbread.

3. The utensil of claim 2, wherein the flatbread is a tortilla.

4. The utensil of claim 3, wherein a space forms between the pair of rods.

5. The utensil of claim 4, wherein the pair of rods are tensioned to taper slightly at the distal end.

6. The utensil of claim 5, wherein the pair of rods comprise a stainless steel composition.

7. The utensil of claim 1, wherein the impeding portion is configured to inhibit movement of the proximal end into the cavity.

8. The utensil of claim 7, wherein the impeding portion is configured to inhibit contact between the flatbread and the handle.

9. The utensil of claim 8, wherein the handle comprises a substantially cylindrical shape configured to be operable to enable a hand to grasp.

10. The utensil of claim 9, wherein the tapered portion comprises a barb configured to at least partially penetrate the flatbread.

11. The utensil of claim 10, wherein the tapered portion is cut on both sides for facilitating use of the utensil from either a left or right handed orientation.

12. A method for holding a flatbread, the method comprising:
obtaining a flatbread;
gripping a handle on the utensil;
orienting a pair of rods disposed in a somewhat parallel spaced-apart relationship to one another, in proximity to the flatbread;
forming a junction at a proximal end of each rod for slightly biasing the pair of rods towards each other;
positioning the flatbread for manipulation with a tapered portion on a distal end of each rod;
moving the pair of rods along an edge of the flatbread, such that a portion of the flatbread positions in a space between the pair of rods;
restricting contact between the flatbread and the handle with a substantially diamond shaped impeding portion at the junction;
rotating the handle in a first direction;

rolling the flatbread into a substantially cylindrical shape; and disengaging the flatbread from the pair of rods by moving the flatbread from a proximal end towards a distal end of the pair of rods.

13. The method of claim 12, wherein the flatbread is a tortilla.

14. The method of claim 13, wherein the pair of rods are tensioned to taper slightly at the distal end.

15. The method of claim 14, wherein the impeding portion is configured to inhibit movement of the proximal end into a cavity in the handle.

16. The method of claim 12, wherein the handle comprises a substantially cylindrical shape configured to be operable to enable a hand to grasp.

* * * * *